United States Patent

[11] 3,614,189

[72] Inventors Wilber Clarence Stewart
Hightstown;
Louis Salvatore Cosentino, Belle Mead,
both of N.J.
[21] Appl. No. 31,162
[22] Filed Apr. 23, 1970
[45] Patented Oct. 19, 1971
[73] Assignee RCA Corporation

[54] HOLOGRAPHIC MEMORY WITH ILLUMINATION HOLOGRAM PROVIDING REFERENCE AND OBJECT BEAMS
6 Claims, 6 Drawing Figs.

[52] U.S. Cl..................................... 350/3.5,
340/173 LT, 350/169
[51] Int. Cl........................................... G02b 27/00
[50] Field of Search............................. 350/3.5,
169; 340/173 LT, 173 SS, 173 MA

[56] References Cited
UNITED STATES PATENTS
3,530,442  9/1970  Collier et al. .................. 350/3.5
OTHER REFERENCES
Pennington, et al. IBM Technical Disclosure Bulletin, Vol. 11, No. 7, Dec. 1968, pp. 820–821 (copy in 350/3.5)
Leith, et al, Jour of the Optical Society of America, Vol. 52, No. 10, Oct. 1962, pp. 1123–1130 (copy in 350/3.5)

*Primary Examiner*—David Schonberg
*Assistant Examiner*—Ronald J. Stern
*Attorney*—H. Christoffersen ABSTRACT: A holographic optical memory is disclosed which utilizes an erasable storage medium such as manganese bismuth. Light from a laser is directed to an illumination hologram, from which a diffracted beam illuminates an object. Light from the object is condensed on a small area of the storage medium. The undiffracted light passing through the illumination hologram is directed as a reference beam to the storage medium, where it interacts with the object beam to record a hologram of the object on the storage medium.

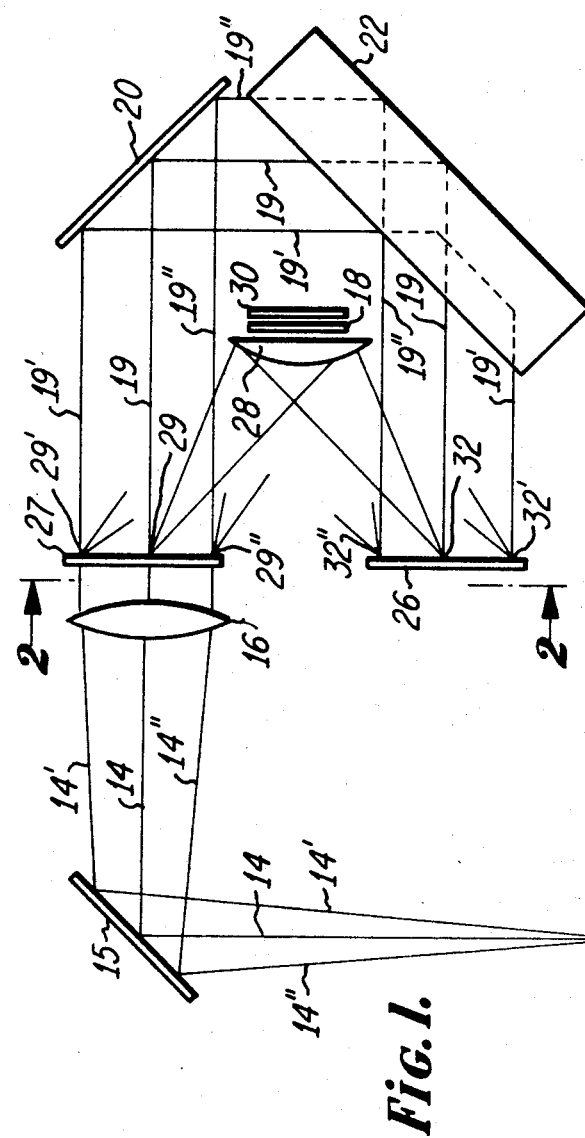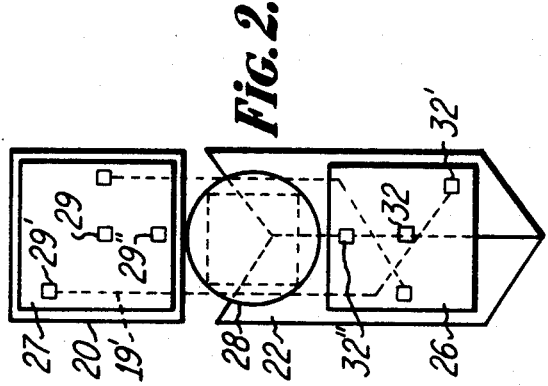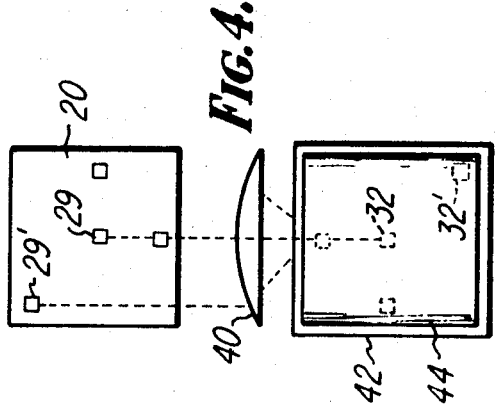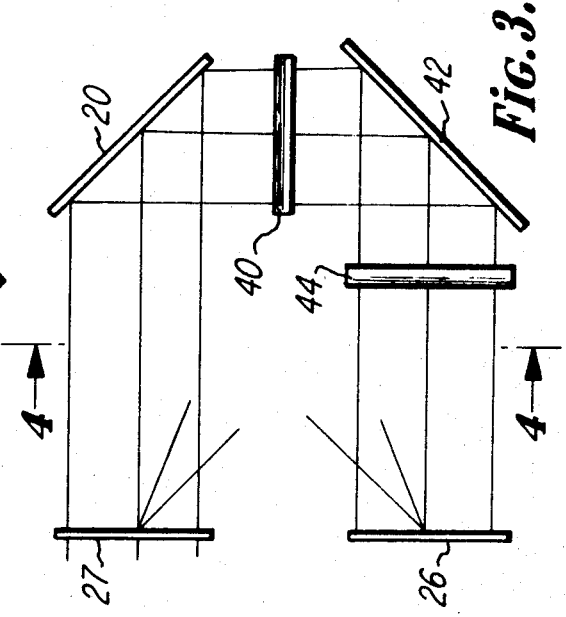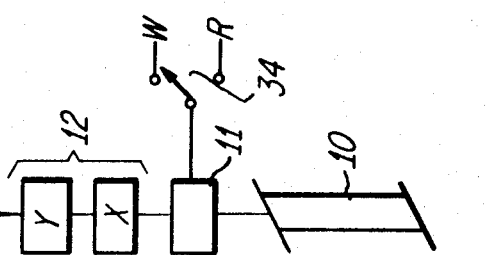
PATENTED OCT 19 1971
3,614,189
SHEET 1 OF 2
INVENTOR.
Wilber C. Stewart &
Louis S. Cosentino
BY Carl V. Olson
ATTORNEY INVENTORS
**Wilber C. Stewart &
Louis S. Cosentino**
BY *Carl V. Olson*
ATTORNEY

HOLOGRAPHIC MEMORY WITH ILLUMINATION HOLOGRAM PROVIDING REFERENCE AND OBJECT BEAMS

BACKGROUND OF THE INVENTION

A computer memory system has been proposed which includes a randomly and electrically accessible semiconductor "page" memory. The semiconductor page memory includes a planar array of electrically accessible flip-flops for storing a corresponding number of binary information bits. In addition, each flip-flop is provided with a photosensor by which the flip-flop can be set in response to received light, and is provided with a light valve controlled by the state of the flip-flop. A laser light source, a light deflector and holographic optics are provided to create a hologram of the array of light valves at any one of many small areas on an erasable holographic storage medium. Subsequently, the hologram can be illuminated to recreate and project the image of the array of light valves onto the array of photosensors to return the information to the flip-flops in the semiconductor page memory. In this way, the semiconductor page memory serves as a page-at-a-time electrical input-output unit for a great many pages of information stored optically on the erasable holographic storage medium. Further information on optical memories is given in an article by Jan. A. Rajchman entitled, "Promise of Optical Memories" appearing at pages 1376-1383 of the *Journal of Applied Physics, Supplement*, Mar. 1970.

Previously known holographic optics in such memory systems are unnecessarily complex in including a relatively large number of optical elements and optical paths such as shown in FIG. 6 of the above publication. It is therefore a general object of this invention to provide an improved and simplified holographic optical system.

SUMMARY OF THE INVENTION

A holographic memory optical system is provided in which a light beam from a laser is directed through an illumination hologram to a holographic storage medium. The illumination hologram is employed to illuminate the object to be recorded, and is also employed as a beam splitter in that the undiffracted beam from the illumination hologram is used as a reference beam. The object beam and the reference beam cooperate in creating a hologram of the object on the storage medium.

BRIEF DESCRIPTION OF THE DRAWING

FIG. 1 is a side view of a read-write holographic memory optical system constructed according to the teachings of the invention;

FIG. 2 is a sectional view taken along the line 2-2 in FIG. 1;

FIG. 3 is a side view of an alternative construction of a portion of the system of FIG. 1;

FIG. 4 is an end view looking in the direction of the arrows 4-4 in FIG. 3;

DESCRIPTION OF THE PREFERRED EMBODIMENT

Figure 6:
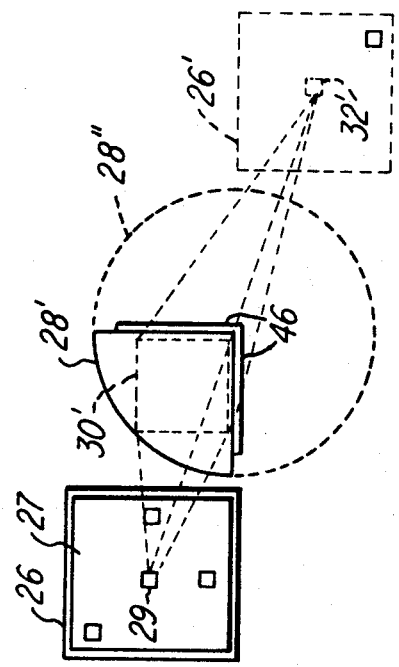
FIG. 6 is an end view looking in the direction of the arrows 6-6 in FIG. 5.

Referring now in greater detail to the drawing, the memory system shown includes a laser 10, a polarization rotator 11 and a beam deflector 12 including x-direction deflector X and y-direction deflector Y. The laser 10 may be a conventional pulsed solid state laser operating in a single transverse mode to produce a polarized and well-collimated beam. The polarization rotator is a conventional device acting in response to electrical input signals st terminal R and W to rotate the polarization of the received laser bean to one or the other of two different polarizations which are 90° apart. The polarization rotator 11 may be an electro-optic material such as potassium dihydrogen phosphate crystal having two electrodes. The polarization of an incident beam is rotated 90° when a suitable voltage is applied to the electrodes.

The X-Y beam deflector 12 may be a known digital light deflector operating in response to electrically induced acoustic waves in a transparent liquid or solid medium. Alternatively, the deflector 12 may be a known digital light deflector including stages of polarization rotators each followed by a double refracting birefringent crystal such as calcite. In this case, it is preferable to reverse the positions of the rotator 11 and deflector 12 in the path of the beam from laser 10. Since some known light deflectors produce relatively small angles of deflection, a long light path for the deflected waves may be necessary between the deflector and the point in the system where the deflected beam is utilized.

The deflected light beam from the laser 10 may be along any one of the paths 14, 14' and 14", or any intermediate path. The deflected beam, after being reflected by a pathfolding mirror 15, is directed through a collimating lens 16 from which the angularly deflected beams emerge in parallel relation to the optical path 14 of a central beam.

A light beam emerging from the collimating lens 16 is directed to a selected single illumination hologram 29 in an array 27 of illumination holograms. Each illumination hologram is constructed to diverge or spread out a received narrow beam to illuminate a page array 30 of binary memory unit and may be a so-called "hololens" as described on page 1,383 of the *Journal of Applied Physics, Supplement*, supra. The portion of beams 14', 14 and 14" which is undiffracted by the illumination hologram 27 continues on along paths 19', 19 and 19" for use as a reference beam in creating a hologram on a holographic storage medium 26. Therefore, the illumination hologram not only illuminates the object 30, but also serves as a beam splitter for separating the laser beam into an object beam and a reference beam.

The diffracted object beam from the illumination hologram 27 is directed along an object beam path which includes a page lens 28, a polarizer 18 and a reflective-type page array 30 of memory units, from which light is reflected back through the polarizer 18 and page lens 28 to the storage medium 26. FIG. 1 shows the object beam path resulting from the impinging of the central beam 14 on a central illumination hologram 29 in the array 27. The central illumination hologram causes the beam to be spread out within a conical or pyramidal solid volume to the page lens 28 and page array 30 of memory units. The light reflected from the page array 30 is concentrated by page lens 28 so that it reaches a small area 32 on the holographic storage medium 26. Similarly, the laser beam when in the deflected position 14' causes an object beam at 32' on the storage medium 26. Likewise a laser beam at 14" results in an object beam reaching the storage medium 26 at small area 32".

The page array 30 of memory units is an integrated array of electrically and optically accessible memory units. Each memory unit may include a bistable transistor flip-flop, a photosensor operating in response to light to set the corresponding flip-flop, and a light valve controlled by the state of the flip-flop to either reflect or block light in accordance with the state of the flip-flop. The construction of the page array 30 of memory units is described in greater detail in U.S. Pat. application Ser. No. 866,645 filed on Oct. 15, 1969 by Walter F. Kosonocky, entitled "Electrically and Optically Accessible Memory," and assigned to the assignee of this present application.

The undiffracted portion of a light beam impinging on the illumination hologram 27 is reflected by a plane mirror 20 and a right angle prism or corner reflector 22 to the holographic storage medium 26. The central beam 14 follows reference beam path 19 to small area 32 on medium 26. Similarly, when the laser beam is deflected to positions 14' and 14", the reference beam follows paths 19' and 19" to small areas 32' and 32", respectively.

The reflector 22 is constructed as a corner reflector to provide a sidewise transposition of the reference beam which matches the sidewise image reversal or inversion caused in the object beam path by the page lens 28, as can be seen in the end view of FIG. 2. For example, the upper reference beam 19' from individual illumination hologram 29' is reflected sidewise as shown in FIG. 2 to the small area 32' on the storage medium 26. This is the same sidewise displacement as is imparted to the object beam in passing through page lens 28. The central reference beam 19 from illumination holograph 29 is simply reflected from the corner of corner reflector 22 and not given any sidewise displacement, so that it arrives at central location 32 on the storage medium. The object beam in going through page lens 28 arrives at the same place. Regardless of the deflected position of the laser beam, both the reference beam and the object beam arrive at the same small area on the storage medium 26.

The erasable holographic storage medium 26 may be constructed of a two-millionths of an inch thick layer of manganese bismuth deposited on an oriented substrate such as mica or sapphire, or on an amorphous substrate such as glass. The assembly is initially heated to form the manganese bismuth film into a single crystal and is later subjected to a strong magnetic field that forces all its magnetic atoms to line up with their north poles in one direction normal to the surface of the film. The direction of magnetization at elemental areas on the film can be changed where optical energy from a laser impinges and generates heat. This is called Curie point writing or recording. If the optical pattern thus recorded in the magnetic condition of the film is a phase hologram, a reference beam directed to the film is reflected with a polarization rotation due to the magneto-Kerr effect which causes a recreation of the optical image at a utilization plane. Alternatively, readout can be accomplished by Faraday-effect magneto-optic rotation of a reference beam transmitted through the manganese bismuth film. The reference beam used during reading is made to be of intensity less than the beam used during writing so that the recorded hologram is not destroyed. Alternatively the reference beam used during reading can be made to have a sufficiently high intensity to provide destructive readout That is the hologram is erased in the process of reading out the optically stored information.

OPERATION OF FIGS. 1 AND 2

The operation of the memory system will now be described. The page array 30 of memory units includes an array of semiconductor memory elements into which binary information is electrically written and stored. Each memory element is coupled to a light valve which reflects light when a "1" is stored and blocks light when a "0" is stored. A graphic image of the array of light valves is then translated into a hologram at one of many small areas on the holographic storage medium 26. The particular small area selected for the storage of the page of information is determined by the amount of $x$ and $y$ deflection given to the light beam from the laser 10. If the central are 32 of the holographic storage medium 26 is to receive the holographic image of the page array, the deflector 12 is made to cause the laser beam to follow the paths labeled 14.

When the information in the page array 30 is to be recorded on, or written onto, the holographic storage medium 26, the laser beam is given a polarization by the polarization rotator 11 which is assigned to the "write" condition as determined by the switch 34. The laser beam impinges on the illumination hologram 29 from which an undiffracted reference beam follows path 19 to small area 32 on the storage medium 26. A diffracted object beam from illumination hologram 29 fans out and goes through page lens 28 and polarizer 18 to page array 30. The object beam as modified by the page array 30 is then reflected back through the polarizer 18 and condensed by lens 28 to the small are 32 on the storage medium 26. The object beam is able to pass twice through the polarizer 18 because the polarizer is constructed and oriented to pass solely light having the "write" polarization determined by switch 34.

The illumination holograms in the array 27 of illumination holograms are preferably constructed so that only the light valves of the memory units are illuminated, to the exclusion of the spaces between light valves where the light would otherwise be wasted. The light valves in the array 30 of memory units are at this time conditioned to reflect or block incident light depending on stage of the corresponding flip-flop in the memory unit. The pattern of light spots created by the open and closed light valves is condensed onto the small area 32 on the holographic storage medium 26. The interfering action of the page array object beam from page array 30 and the reference beam produces a page hologram at the small area 32 on the medium 26. The thus-recorded page hologram remains on the manganese bismuth storage medium until it is intentionally erased. Erasure of a single page hologram on the medium 26 can be accomplished by illuminating the hologram, with a light intensity lower than needed for Curie point writing, in the presence of a magnetic field having an intensity too low to erase nonilluminated page holograms.

The page array hologram which has been described as being formed at the small area 32 on the holograph medium 26 could have been recorded at any other selected position on the medium 26 by appropriately controlling the $x$ and $y$ deflection imparted to the laser beam by the deflector 12.

When it is desired to retrieve and utilize the page of information stored as a hologram in the small area 32 of the medium 26, the "read" terminal R of polarization rotator 34 is energized and the laser 10 is pulsed. When the beam 14 has the "read" polarization, the portion of the beam diffracted by the illumination hologram 27 is blocked by the polarizer 18 and is thus prevented from continuing along the object beam path to the recording medium 26.

When reading, the reference beam impinging on the hologram storage medium at 32 (or at any other selected storage location), causes light to be reflected in a conical or pyramidal shaped volume back to the photosensors on the page array 30 of memory elements. The electrical outputs of the photosensors respond to the received light pattern to set the corresponding flip-flops in the corresponding memory units in accordance with the image recreated from the hologram 32 on the medium 26. Thereafter, with the flip-flops in the page array 30 retaining the digital information, the information can be read out electrically by means not shown.

The same reference beam path is used for both writing and reading. This is possible because the reference beam impinges on the storage medium at normal (perpendicular) incidence. When it is desirable, as it is in the described memory system, to reconstruct a real image by reflection from a stored hologram in exactly the same position that the object occupied when the hologram was recorded, the reconstruction (or reading) reference beam must be conjugate to the recording (or writing) reference beam. This can be done by having the reading and writing reference beams make conjugate angles with respect to the perpendicular direction from the hologram. However, a reference beam impinging at normal incidence is conjugate with itself and may be used for both reading and writing. Another holographic memory optical system using a reference beam normal to the recording medium is shown and described in application Ser. No. 31,284 filed concurrently herewith by Wilber C. Stewart, entitled "Holographic Memory with the Same Reference Beam Used for Writing and Reading," and assigned to the same assignee as the present application.

DESCRIPTION OF FIGS. 3 AND 4

Reference is now made to FIGS. 3 and 4 for a description of an alternative construction of the system of FIGS. 1 and 2 in that the prism or corner reflector 22 in FIGS. 1 and 2 is replaced by a first cylindrical lens 40, a plane mirror 42 and a second cylindrical lens 44. The cylindrical lenses each have a focal length of F and are spaced apart a distance 2F. The cylindrical lenses perform the same function as the corner reflector 22 in FIGS. 1 and 2 in providing a sidewise transposition of the reference beam which matches the sidewise image reversal or inversion caused in the object beam path by the page lens 28.

Figure 5:
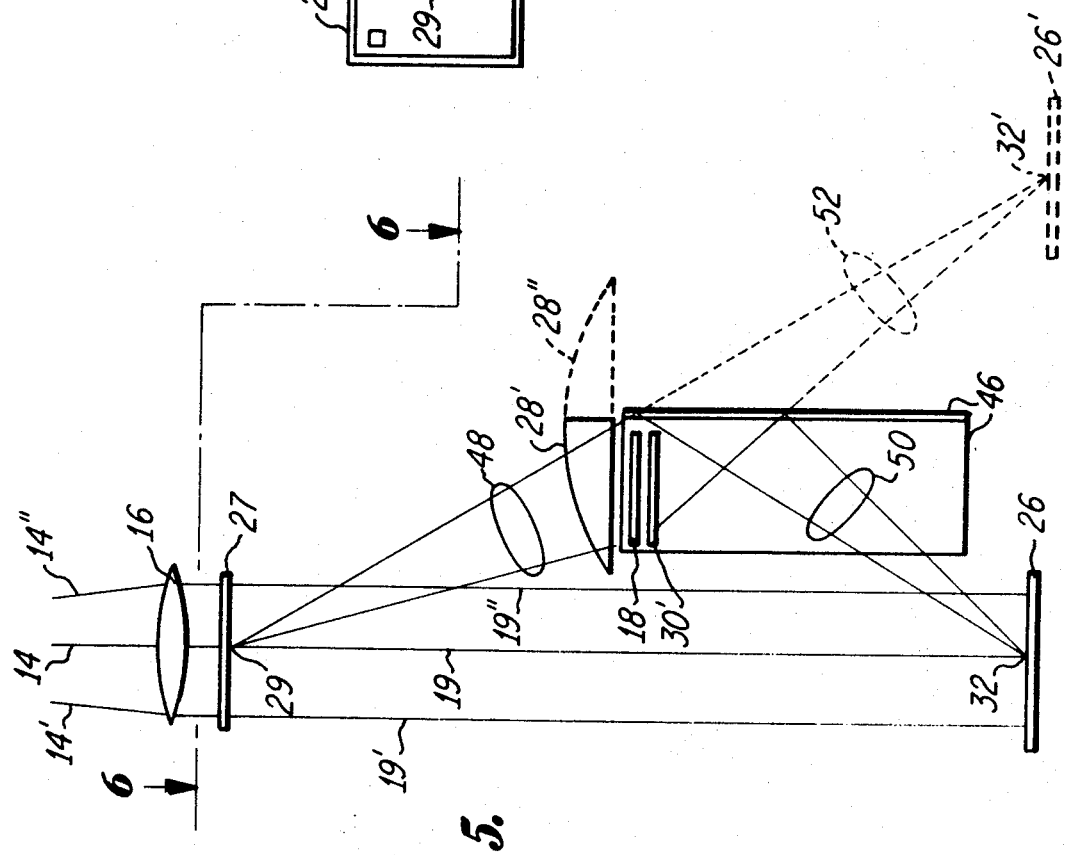
FIG. 5 is a side view of a holographic optical system differing from that shown in FIG. 1 in that light transmitted through the object is used in place of light reflected from the object.

DESCRIPTION OF FIGS. 5 and 6

Reference is now made to FIGS. 5 and 6 which show a holographic memory optical system for use with a page array 30' of the light-transmitting type, rather than the light-reflecting type. When the laser beam has the central position 14 illuminating individual illumination hologram 29, an undiffracted reference beam 19 passes directly to the small area 32 on the storage medium 26. The diffracted object beam spreads out along path 48 through page lens 28', and through polarizer 18 to illuminate the page array 30' of memory units. The page lens 28' is one-quarter of a spherical lens, the cutaway, or unused, portion of the complete lens being represented at 28''.

Following the polarizer 18 and the transmissive type page array 30', there is a prism or corner reflector 46 positioned to reflect the object beam condensed along path 50 by quarter lens 28' to the small area 32 on the recording medium 26. This is done with a sidewise transposition compensating for the reversal in quarter lens 28'. If the corner reflector 46 were absent, the condensed object beam would follow the dotted-line path 52 to a location 32'. The unused portion 28'' of the quarter lens 28', and the unused object beam path 52 are included in the drawing merely for the purpose of assisting in a visualization of the operation of the quarter lens and corner reflector in directing the object beam to the same area 32 on the storage medium to which the reference beam 19 is directed. In operation, the memory system of FIGS. 5 and 6 is the same as has been described in connection with FIGS. 1 and 2.

SUMMARY

The herein disclosed holographic memory optical systems are advantageous in that they employ a single reference beam path for both writing and reading, and in that they employ an illumination hologram for the additional function of splitting the received laser beam into a reference beam and an object beam.

What is claimed is:
1. A holographic recording system, comprising
   a holographic storage medium having many storage locations,
   an object,
   an array of illumination holograms, there being an illumination hologram for each respective storage location,
   means to record at a selected storage location by deflecting a laser beam to the corresponding one of said illumination holograms to produce an undiffracted light beam directed as a reference beam to the corresponding selected storage location on the storage medium, and a diffracted light beam which illuminates the object, and
   optical means to condense the light from the illuminated object onto said selected storage location on the storage medium,
   whereby to record a hologram of said object at said storage location on said storage medium.
2. A system as defined in claim 1 wherein said optical means to condense the light from the illuminated object includes a lens positioned to act on light reflected from said object location.
3. A system as defined in claim 2 wherein said undiffracted reference beam follows a path including a plane mirror and a corner mirror.
4. A system as defined in claim 2 wherein said undiffracted reference beam follows a path including a plane mirror and two cylindrical lenses.
5. A system as defined in claim 1 wherein said undiffracted reference beam follows a straight path to said storage medium.
6. A system as defined in claim 5 wherein said optical means to condense the light from the object onto the storage medium includes a lens and a corner mirror.